(No Model.) 2 Sheets—Sheet 1.

M. GANDY.
METHOD OF FORMING ENDLESS LAMINATED BELTS.

No. 358,809. Patented Mar. 1, 1887.

Witnesses.
Chas. B. Bull
Robert Bartlett

Inventor.
Maurice Gandy
by Brodnax & Pile
Attys.

(No Model.) 2 Sheets—Sheet 2.

M. GANDY.
METHOD OF FORMING ENDLESS LAMINATED BELTS.

No. 358,809. Patented Mar. 1, 1887.

Witnesses.
Saml R. Taylor
Robert Bartlett

Inventor.
Maurice Gandy

UNITED STATES PATENT OFFICE.

MAURICE GANDY, OF NEW BRIGHTON, COUNTY OF CHESTER, ENGLAND.

METHOD OF FORMING ENDLESS LAMINATED BELTS.

SPECIFICATION forming part of Letters Patent No. 358,809, dated March 1, 1887.

Application filed August 20, 1886. Serial No. 211,436. (No model.)

*To all whom it may concern:*

Be it known that I, MAURICE GANDY, a subject of the Queen of Great Britain, residing in New Brighton, county of Chester, England, have invented certain new and useful Improvements in the Method of and Means for Making Belts for Driving Machinery, of which the following is a description in such full, clear, concise, and exact terms as to enable any one skilled in the art to which my invention belongs to make and use the same, reference being had to the accompanying drawings, making part of this specification, and to the figures and letters of reference marked thereon—

Figure 1:
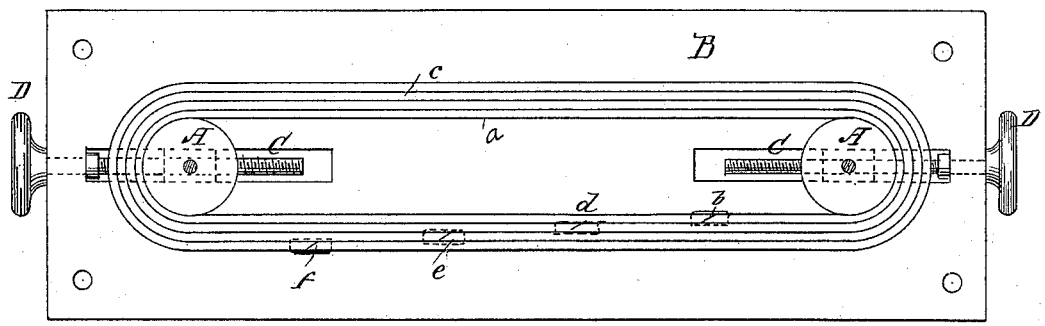
Figure 2:
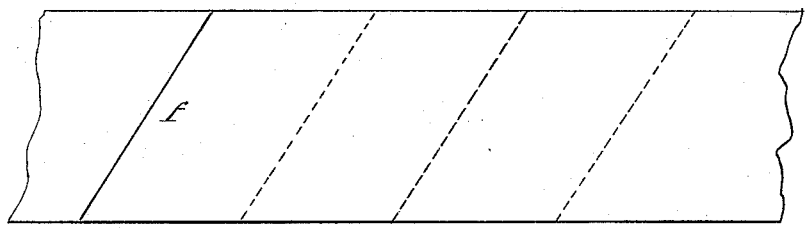
Figure 3:
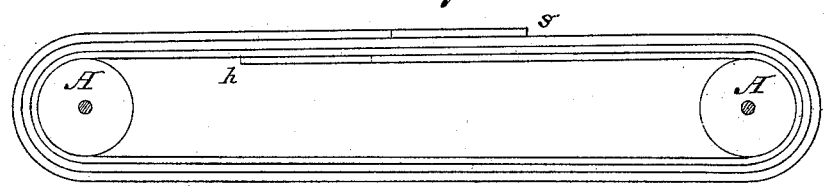
Figure 4:
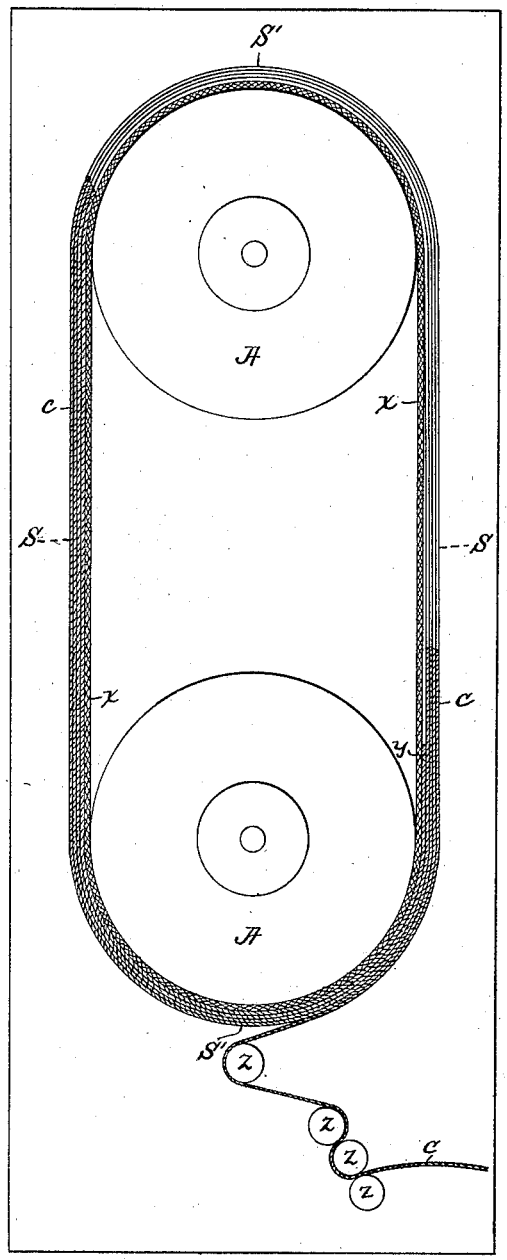

Figure 1 being a plan of an apparatus upon which the belt is constructed; and Figs. 2, 3, and 4 show a novel method of constructing a belt, as hereinafter described.

My invention relates to a belt composed of a plurality of plies, each ply being separate and distinct from all the rest, the several plies being then piled one on the other flatwise, and fastened together by any suitable means.

My invention consists in the method of and means for forming a belt around a pair of pulleys or circular forms to correspond sufficiently for all practical purposes with the pulleys upon which the belt is to run when in actual service, by which means the several plies composing the belt increase in length from the inside outward, the thicker the belt being the longer will be the outside ply. In a belt made in this way all the plies will draw exactly alike, and the inside plies will not crimp, wrinkle, or cut upon the pulleys.

Being a manufacturer of canvas belts, I am of course aware that it is a common practice to make such belts of several thicknesses of canvas, the canvas being folded to the desired thickness to form the belt, the folding being so arranged as to inclose the selvage within the folds of the belt, the several folds being then stitched together.

This method of making the belt develops two objections: first, the folded edges in running through the shifting-forks are cut off, causing the canvas to fray and disintegrate the belt; second, all the plies composing the belt are parts of the same width of canvas, and must therefore necessarily be of the same length, and the belt must necessarily crimp or wrinkle upon the pulleys; and where the pulley is small and the velocity high this objection becomes very serious, the belt rapidly cutting itself to pieces.

In making a belt of folded material it is impossible to construct it over a form making the outside plies longer than the inside ones, as I have above described, for the reason that all of the plies are integral parts of each other.

The apparatus used in the practice of my invention is illustrated substantially by Fig. 1, which is a horizontal section through the apparatus, A being a pair of rollers or loose pulleys turning freely upon their axes, which may be set vertically or horizontally, as may be thought most convenient.

B is a frame-piece, in which slots C are made to carry suitable journal-boxes to support and contain the ends of the roller-shafts. These journals-boxes are connected to screws D, set in the frame-piece, by which the rollers or pulleys are shifted to or from each other, thus adapting the form to belts of different lengths, and of course different-sized rollers or pulleys may be used in the frame to suit the exigencies of each case. There are of course two frame-pieces like B, held apart by suitable joists or timbers, each frame-piece carrying one end of the roller or pulley shaft. This frame being constructed substantially as above described, the inside ply of canvas, *a*, is drawn over it and the ends tacked together, as at *b*. A second ply, *c*, is then drawn over the first one, and the ends tacked, as at *d*, and so on, changing the joints of each ply, as at *e f*, until the belt is built up to the desired thickness. These several plies, being drawn snugly upon each other, are then tacked together, and then taken off the former and stitched on the sewing-machine, or fastened together by any other suitable means, as above described. Another and substantially the same method of making and joining the belt is illustrated by Fig. 3. In this case a long strip of material of the desired width is wrapped upon the former or pulleys, one ply on another, until the desired thickness is obtained, and the several plies are then fastened together as before, the ends lapping, as at *g h*. By these means it will be observed that an endless belt is made not only to exactly fit the pulleys on which it is to run, and having no tendency to wrinkle, but is also made without splicing, as in the ordinary endless belt. In making these belts I prefer to join the ends of the belt diagonally, as at Fig. 2, and, if the belt is made of canvas, to have the canvas hard woven and the warp-thread larger than the weft; and I also prefer to soak them in oil, press and stretch them; but I do not intend to limit my patent to belts so made.

In wrapping the belt around the formers A A, I prefer to employ a former-belt, as illustrated by x x, Fig. 4. This former-belt is an ordinary endless belt wrapped around the former-rollers A A. To this belt, as at y, I attach the end of the band c c by stitches or other suitable means. This band c c, in approaching the former, passes through the friction device z z. After it has been attached to the former-belt the rollers A A are caused to revolve, drawing the band c through the friction-rollers z z until the required thickness of belt is laid up. Then the band is cut and the end tacked to the body of the belt to prevent it unrolling. The fastening y may then be cut and the belt taken off the former to be stitched, or the layers otherwise fastened together. Whether the belt be laid up on the former-belt, as described, or otherwise, and irrespective of the fact whether the belt be made of one continuous strip or of several separate strips, as described, I prefer to tack the belt in the following manner before it is taken off the frame:

About midway between the formers A A, on both sides, as at S S, I securely tack all the plies of the belt together. I then revolve the rollers to give the belt a quarter of a turn—that is to say, until the points S' S' arrive at a position midway between the rollers—and then I tack the plies there firmly together. If desirable, the belt may thus be tacked at several other points on substantially the same plan. The object which I have in view in thus tacking the belt before it is taken from the former is to bring and hold the several plies in the same relative position to each other throughout the whole length of the belt. If the plies of the belt should be sewed or otherwise attached to each other while it was held in the position it occupies in the formers, the fullness of the outer plies would all be held at the curved ends and the sides of the belt would be straight; hence the belt in running upon the pulleys would subject the plies to unequal strain, which would have a tendency to pull them apart; but by employing the method I have described the fullness of the outer plies is distributed throughout the whole length of the belt. Again, if the plies were not tacked together at more than one point, in sewing the belt the machine would be apt to draw all the fullness of the belt to one part, and thus interfere with its efficiency. Instead of tacking the plies of the belt together before the belt is taken off the former, I may accomplish the same object substantially by laying the belt out after it is taken off in the form of a true circle, and then tacking it together at several points, or by sewing the belt by a machine as it is being slowly fed forward by the revolution of the pulleys.

I have described the best way of making the belt, and I understand that any merely formal change will be included by the above description.

I do not in this application intend to cover the belt or belts hereinbefore described, as they are covered by Letters Patent issued to me November 9, 1886, No. 352,460.

The substantial features of novelty which I desire to secure by these Letters Patent are the following:

1. The method of forming laminated belts, which method consists of wrapping the several plies of said belt upon a former, layer upon layer, and of then fastening the several plies together, making a belt in which the outside plies increase in length as the belt increases in thickness, substantially as described.

2. The method of forming endless belts, which consists of wrapping a single length of material upon itself around formers until the required thickness of the belt is obtained, and of fastening the several plies together, substantially as described.

3. The method of forming endless laminated belts, which consists of wrapping a single ply of material around a former and fastening its ends together, of then wrapping another ply of material around said last-mentioned ply and fastening its ends together, and so on until the required thickness of belt is obtained, and fastening said several plies together, the joints of the several plies being at different points, substantially as described.

4. The method of forming laminated belts, which method consists of wrapping the several plies of said belt upon a former, layer upon layer, and of then tacking the plies together at several points to hold them in the proper relative position, and subsequently removing the belt from said former and then attaching the several plies together throughout their entire length, substantially as described.

MAURICE GANDY.

Witnesses:
J. EDGAR BULL,
ROBERT BARTLETT.